Sept. 29, 1931.  A. G. HORVATH  1,825,631
WATER SOFTENING
Filed Dec. 9, 1926
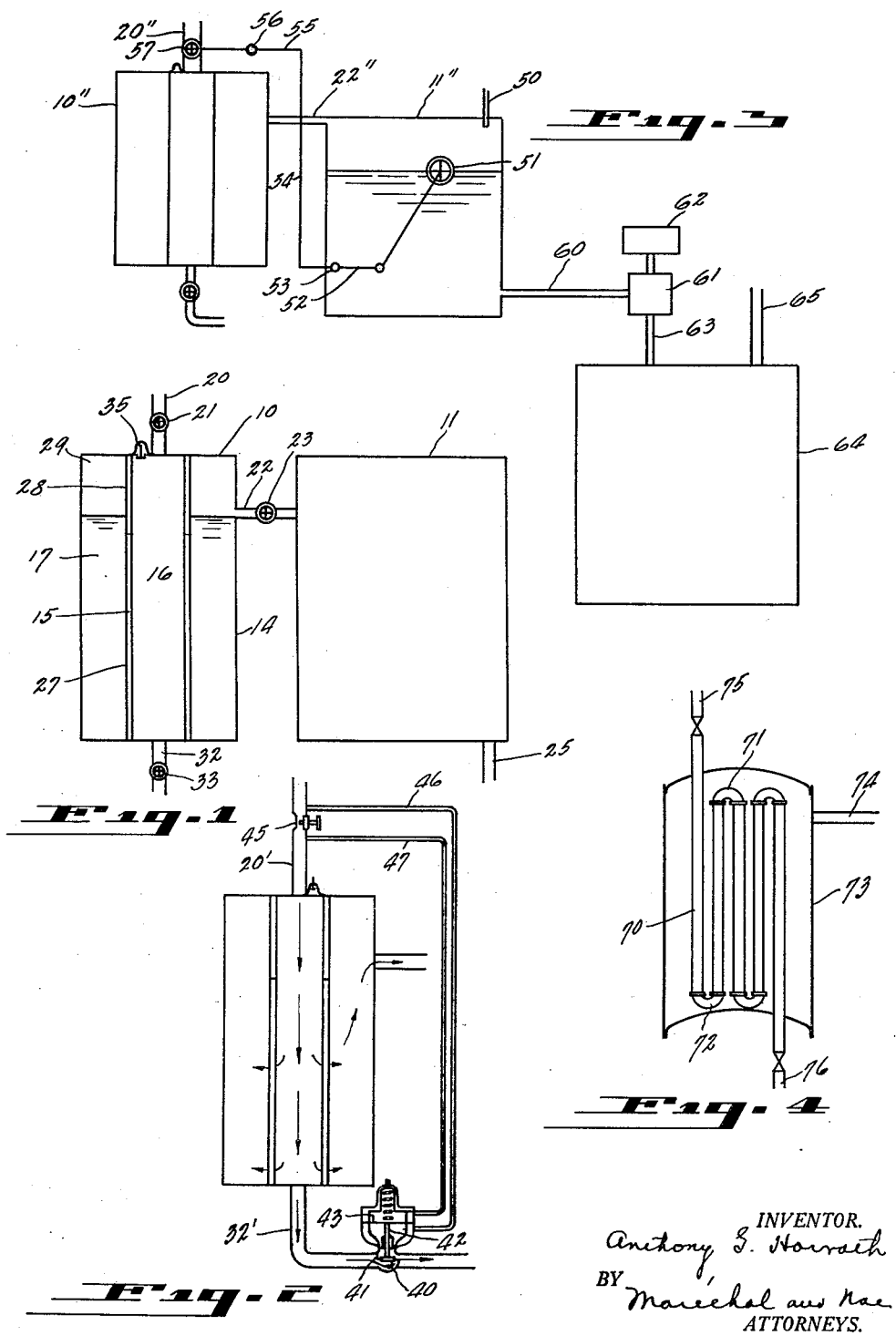
INVENTOR.
Anthony G. Horvath
BY
ATTORNEYS.

Patented Sept. 29, 1931

1,825,631

UNITED STATES PATENT OFFICE

ANTHONY G. HORVATH, OF DAYTON, OHIO, ASSIGNOR, BY MESNE ASSIGNMENTS, TO UNIFLOW MANUFACTURING COMPANY, OF ERIE, PENNSYLVANIA, A CORPORATION OF PENNSYLVANIA

WATER SOFTENING

Application filed December 9, 1926. Serial No. 153,579.

This invention relates to water-softening. One of the principal objects of the invention is to provide a method of, and apparatus for, water-softening, in which a suitable proportion of the dissolved chemicals, which go to make the water "hard", are removed without the necessity of the usual chemical reactions.

Another object of the invention is to provide for the softening of water by means of a reverse osmotic action.

Other objects and advantages of the invention will be apparent from the following description when taken in connection with the accompanying drawings.

In the drawings in which like characters of reference designate like parts throughout the several views thereof, Fig. 1 is a somewhat diagrammatic illustration, in vertical section, through apparatus constructed for practicing the method of this invention;

Fig. 2 is a corresponding view of a slightly modified form of apparatus;

Fig. 3 is a corresponding view of still another modified form of apparatus; and

Fig. 4 is another modified form.

Water softeners are widely known and widely used. Water softeners as heretofore used are of the chemical type, in which the softening is accomplished through the use of a chemical material, which will react with the "hard" salts in solution in the water to form an insoluble compound which will be precipitated, thus leaving the water to be used free from objectionable quantities of such "hard" salts. And the chemical which thus reacts is of such character that it may be regenerated through the action of a suitable chemical salt solution, such as a solution of sodium chloride or something of that character, to return it to its original water-softening condition. Such softeners are effective in operation, and since the softening material may be used and regenerated time after time are inexpensive after installation. However, they are generally objectionable since they require considerable personal attention in use.

The present invention accomplishes the same results—that is, the removal of objectionable quantities of "hard" salts from the water—without the use of chemical reactions, and utilizes as its basis the principle of osmosis.

As is well known when water and a solution of some material, such as sugar in water, for example, are separated by a semi-permeable membrane, the practical result is the passage of the water through the semi-permeable membrane, into the sugar solution. This is called osmosis. In osmosis there is always a flow from the more dilute to the less dilute solution; osmosis acting, to state the matter rather crudely, as if increasing the concentration of the material dissolved in the solution tends to decrease its capacity to flow through the semi-permeable membrane. As a matter of fact what apparently happens is that the semi-permeable membrane has such fine passages therethrough that the molecules of water can pass through, but the molecules of the material in solution, being more complex and therefore of larger size, are prevented from passing. This however is merely theory, and it not at all necessary to an understanding of the invention. The fundamental thing is that in osmosis there is an actual passage of fluid from the more dilute to the less dilute solution—as if there were a preponderating pressure exerted on the more dilute solution to force the water thereof through the semi-permeable membrane into the more concentrated solution.

In carrying this method into effect these principles are utilized. Water to be softened constitutes a solution containing salts which react with soap to form insoluble compounds. If this salts solution is maintained on one side of a semi-permeable membrane, on the other side of which water free from objectionable quantities of salts is maintained, there will be a tendency for the water to flow from the softer water into the harder water, which is of greater concentration. But I have found that if a suitable pressure, in excess of the pressure on the soft-water side, is applied to the more concentrated solution of hard water, in a degree sufficient to overcome the tendency of the soft water to flow through the semi-permeable membrane into the hard water, a flow in the reverse direction will be secured. As a result instead of the soft or purer water flowing through the semi-permeable membrane to dilute the more concentrated solution of hard water, a flow in the reverse direction may be caused to take place, under the action of the pressure applied to the hard water, and substantially soft water will pass in the reverse direction through the semi-permeable membrane thus adding to the quantity of soft water, and at the same time tending to increase the concentration of the hard water.

The amount of pressure which must be applied is dependent upon the relative concentration of the two solutions on opposite sides of the semi-permeable membrane. As that relative concentration increases the relative pressure differential must increase, and vice versa. Therefore means is preferably provided whereby the concentration of the hard water may remain substantially constant by replenising the supply of hard water so that the operation may take place under a predetermined pressure, at a substantial constant effectiveness of reverse osmotic flow through the semi-permeable membrane. Of course, if desired, the pressure on the hard water may be increased as the concentration increases, to maintain the desired rate of flow. Or the pressure on the soft water side may be correspondingly decreased to accomplish similar results. Reverse flow through the membrane, but at a somewhat slow rate with the type of membrane herein described, is secured from differential pressures across the membrane of five pounds; but increasingly rapid flow will result from increased differential pressures.

As illustrating a simple form of apparatus for applying this method to the practical purposes of softening water for domestic or household use, or analogous uses, the apparatus shown in Fig. 1 illustrates somewhat diagrammatically one preferred embodiment or form of mechanism.

The apparatus comprises an osmotic cell indicated generally at 10 wherein the hard water is placed under pressure on one side of a semi-permeable membrane with the production of a supply of soft water on the other side of the membrane. The numeral 11 indicates a storage tank adapted to receive the soft water produced by the osmotic cell.

As illustrated, the osmotic cell comprises a semi-permeable membrane indicated at 15. This membrane is shown as a porous tube which divides the container 14 into a central chamber 16 and an outer annular chamber 17. The tube 15 may be of any suitable semi-permeable material, and satisfactory results have been secured with a porous tube of porcelain impregnated with a film or deposit of copper ferrocyanide. The copper ferrocyanide may be electrically deposited after the porous cup has been soaked in pure water and then subjected to vacuum to remove air from its pores; but the semi-permeable membrane may be made in other known ways. However any suitable form of semi-permeable membrane may be used, which has sufficient strength to withstand the pressures to which it is subjected and which stands up well during use.

Hard water is admitted to the central chamber 16 through the inlet pipe 20 controlled by a valve 21. This inlet pipe 20 leads from a suitable source of hard-water under pressure, and is shown as a part of the usual house water line supplying water under pressure. The chamber 17 is connected by a pipe 22 controlled by a valve 23 to the storage tank 11. The pressure within the chamber 17 and the storage tank 11 is of course kept below that within the chamber 16 so that a pressure differential is obtained between the two sides of semi-permeable membrane 15. This pressure differential under usual city water pressures will be sufficient to cause a flow of water from the hard-water solution through the semi-permeable membrane to the chamber 17, thus producing a supply of soft water therein which overflows through the pipe 22 into the storage tank 11. The tank 11 is provided with a discharge pipe 25 which leads to a place of use.

As illustrated, the membrane 15 may be provided with a lower active portion indicated at 27 which is suitably impregnated as previously described, and an upper inactive portion indicated at 28. By positioning the overflow pipe 22 at substantially the lower end of the inactive portion 28, an air space 29 is provided at the upper end of the annular chamber 17 and tank 11. This provides for an automatic control of the apparatus, as when the level of the soft water produced rises in the tank 11 and the annular chamber 17 above the overflow pipe 22, the air in the chamber 29 and the upper part of the tank is compressed until the pressure within the chamber 17 rises so that the reverse osmotic flow automatically ceases.

In order to prevent the concentration of the hard-water solution within the chamber 16 from increasing beyond desired limits as the water is removed from this solution leaving the salts behind, a drain or waste outlet pipe 32 controlled by a valve 33 is provided. The valves 21 and 33 may be so adjusted as to permit the outflow of waste hard water through the pipe 32 in accordance with the introduction of fresh hard water through the inlet 20, whereby the pressure in the chamber 16, and also the concentration of the hard-water solution therein are controlled. In order to permit the escape of entrapped air from the central chamber 16, an air valve 35 may be provided at the upper end of this chamber.

The water-softening apparatus as herein illustrated may be positioned in the attic of the home, whereby flow by gravity is obtained from the storage tank 11 to the places of use within the house. The flow through a semi-permeable membrane of this character may be relatively slow, but as the operation of the device is continuous, and the storage tank 11 may be constructed of suitable size to store up sufficient water during periods of non-use to meet the demand during the periods of use, a supply of soft water is automatically maintained at all times, the device continuously functioning without attention on the part of the user. The apparatus is shown herein diagrammatically and of course the quantity of flow may be increased or decreased by varying the effective surface of the membrane—other conditions remaining the same.

Referring to Fig. 2, a somewhat modified form of apparatus is illustrated wherein the flow through the waste outlet pipe 32' is automatically controlled in accordance with the rate of introduction of fresh hard water through the inlet pipe 20'. As illustrated a valve 40 is provided with a valve seat 41 within the waste outlet pipe 32'. The valve stem 42 is attached at its upper end to a diaphragm 43 which is subject to pressure changes above and below the diaphragm, the valve being thus controlled by the pressure differential existing between the two sides of the diaphragm. The inlet pipe 20' is provided with a valve-controlled constriction indicated at 45. As is well known increase of flow through such a constriction results from increase in pressure differential existing between opposite sides of the constriction. Pressure tubes 46 and 47 communicate the pressures existing ahead of the constriction and behind the constriction to the spaces below and above the diaphragm 43 respectively. In this manner the position of the waste outlet valve 40 is automatically controlled in accordance with the rate of flow of fresh hard water through the inlet pipe 20', an increase of flow being attended by an increase in the opening of the valve 40 and a decrease of flow by a decrease in the opening of the valve.

In Fig. 3 is illustrated a further modified form of water-softening apparatus adapted for household use or the like, which apparatus may be positioned within the basement of a home. This apparatus comprises an osmotic cell 10'' which as shown is similar to the cell 10 shown in Figs. 1 and 2, having an inlet 20'' and an overflow pipe 22'' connected to a storage tank 11''. In this form the soft-water side of the semi-permeable membrane is kept at atmospheric pressure, and for this purpose the tank 11'' is provided with a vent indicated at 50. The flow through the membrane is automatically controlled in accordance with the quantity of soft water within the tank 11''. For this purpose, a float 51 is provided which operates in accordance with the level of the liquid within the tank 11'' a lever 52 pivoted at 53 to thereby actuate through a connecting link 54 a second lever 55 pivoted at 56, which in turn controls the valve 57 governing the inflow of fresh hard water to the osmotic cell. The construction of the float and linkages is such that when the level of liquid within the tank 11'' rises to a predetermined point, the valve 57 is automatically closed to shut off the flow of fresh hard water to the osmotic cell.

In order to supply the soft water under pressure to the desired places of use within the house or the like, the tank 11'' may be connected by a pipe 60 with a conventional automatic pump indicated at 61 which may be actuated by an electric motor indicated at 62 in the conventional manner, the pump forcing the water under pressure through a pipe 63 to a pressure storage reservoir 64 which in turn supplies the usual house lines through a pipe 65. The pump and storage reservoir may be of entirely conventional construction and is merely illustrated diagrammatically herein, it being understood that the pump serves to automatically maintain pressures within the storage reservoir 64 within desired limits for use. No special means for controlling the hard-water pressures at the semi-permeable membrane is shown, other than the control valves which will function to decrease the usual supply pressure of the hard water. And as city water is generally supplied at pressures of from fifty to one hundred pounds per square inch that pressure control will normally be sufficient. But of course any suitable pump or other means for boosting the pressure, or pressure reducing valves or the like for reducing the pressure, may be used if desired.

In Fig. 4 is shown still another slightly modified form of mechanism. In this form of the apparatus the semi-permeable membrane is in the form of tubes of comparatively small diameter, there being a plurality of these tubes each designated by the numeral 70, the adjacent tubes being connected together so as to form a continuous tortuous passage. The elbows which connect the tubes together at their ends are indicated respectively by the numerals 71 and 72, the lower elbows 72 being detachable to permit removal for ready cleaning. These elbows act as traps to collect any sediment which tends to separate out as the water flows through the tubes 70. These tubes are enclosed within a suitable casing 73, which has an outlet pipe 74 leading to a tank or other place of use for storage. The hard water is introduced through the inlet 75 into the tubes, and is discharged through a drain 76. This construction gives a comparatively large surface area for contact with the water to be softened, and because of the small diameter of the tubes, eddy currents which might tend to increase the concentration of water adjacent the surface of the membranes are prevented.

For purposes of easy description the objectionable salts normally present in water have been referred to above as "hard" salts. It is to be understood of course that a semipermeable membrane such as described is operable to remove salts in solution which may not be particularly objectionable, at least in limited quantities, and also discrete particles of organic or inorganic matter which are of such small size that they will pass through the ordinary filter. It is to be understood that the term "hard salts" as used above and in the claims is intended to refer to any objectionable materials held mechanically or in solution within the water.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:—

1. The method in the softening of hard water containing salts which react with soap to form insoluble compounds which comprises maintaining hard water and softened water on opposite sides of a semi-permeable membrane, exerting a controlled pressure on the hard water to effect reverse osmotic flow through said membrane, and maintaining controlled concentration of said hard water.

2. The method in the softening of hard water containing salts which react with soap to form insoluble compounds which consists in introducing hard water under pressure to one side of a semi-permeable membrane which is permeable to the water molecules but substantially impermeable to the salt molecules contained in said hard water, effecting reverse osmotic flow through said membrane, removing soft water passed through said membrane, and draining a portion of said introduced hard water from said one side of the membrane to control the concentration of said hard water.

3. A continuous method of softening hard water containing salts which react with soap to form insoluble compounds for household use or the like, which consists in introducing hard water under pressure to one side of a semi-permeable membrane, effecting reverse osmotic flow through said membrane to produce soft water, and controlling the introduction of hard water to said membrane in accordance with the use of the soft water.

4. An osmotic water-softening apparatus for softening hard water containing salts which reacts with soap to form insoluble compounds comprising a liquid container, a semi-permeable membrane therein in the form of a hollow tube dividing the container into a central chamber and an outer annular chamber in both of which water is maintained in engagement with said membrane, said tube having an inactive portion at the upper end thereof, means for introducing hard water under pressure into one of said chambers, and means for removing soft water from said other chamber at substantially the level of the lower end of the inactive portion of said tube, thereby forming an air space within said latter chamber.

In testimony whereof I hereto affix my signature.

ANTHONY G. HORVATH.